United States Patent
Snell

(10) Patent No.: US 9,567,772 B1
(45) Date of Patent: Feb. 14, 2017

(54) RETRACTABLE CABLE LOCKING DEVICE

(71) Applicant: Larry Snell, Denver, CO (US)

(72) Inventor: Larry Snell, Denver, CO (US)

( * ) Notice: Subject to any disclaimer, the term of this patent is extended or adjusted under 35 U.S.C. 154(b) by 0 days.

(21) Appl. No.: 14/921,186

(22) Filed: Oct. 23, 2015

(51) Int. Cl.
| | |
|---|---|
| *E05B 71/00* | (2006.01) |
| *E05B 45/00* | (2006.01) |
| *E05B 67/00* | (2006.01) |
| *E05B 73/00* | (2006.01) |
| *B62H 5/00* | (2006.01) |
| *B62H 5/20* | (2006.01) |
| *E05B 19/00* | (2006.01) |
| *E05B 47/00* | (2006.01) |

(52) U.S. Cl.
 CPC ............ *E05B 45/005* (2013.01); *B62H 5/001* (2013.01); *B62H 5/003* (2013.01); *B62H 5/20* (2013.01); *E05B 19/00* (2013.01); *E05B 47/00* (2013.01); *E05B 67/006* (2013.01); *E05B 73/0011* (2013.01); *E05B 2047/0067* (2013.01); *E05B 2047/0072* (2013.01); *Y10S 70/49* (2013.01); *Y10T 70/483* (2015.04); *Y10T 70/5872* (2015.04); *Y10T 70/5881* (2015.04)

(58) Field of Classification Search
 CPC ........... B62H 5/001; B62H 5/003; B62H 5/20; E05B 19/00; E05B 73/0011; E05B 47/00; E05B 67/006; E05B 2047/0072; E05B 2047/0067; E05B 73/0005; E05B 67/003; Y10S 70/49; Y10T 70/483; Y10T 70/5872; Y10T 70/5876; Y10T 70/5881
 USPC .... 70/14, 18, 30, 49, 58, 233–235, DIG. 49; 242/378, 378.4, 379, 379.2; 340/542, 340/568.1, 572.8, 572.9, 568.2
 See application file for complete search history.

(56) References Cited

U.S. PATENT DOCUMENTS

| | | | |
|---|---|---|---|
| 3,824,540 A | 7/1974 | Smith, II | |
| 4,245,798 A * | 1/1981 | Steger | B60R 22/3416 242/378.4 |
| 4,776,188 A | 10/1988 | Dalaba et al. | |
| 4,885,920 A * | 12/1989 | Larson | E05B 67/006 211/7 |
| 4,896,517 A | 1/1990 | Ling | |
| 5,408,212 A | 4/1995 | Meyers et al. | |
| D451,368 S | 12/2001 | Hardesty | |
| 6,874,722 B2 * | 4/2005 | Wei | B65H 75/368 191/12.2 R |
| 7,239,244 B2 * | 7/2007 | Leyden | E05B 67/063 340/568.2 |
| 8,065,895 B2 | 11/2011 | Andersen | |

(Continued)

FOREIGN PATENT DOCUMENTS

WO    WO2014205345    12/2014

*Primary Examiner* — Lloyd Gall

(57) ABSTRACT

A retractable cable locking device for securing articles with retractable cables includes a housing that has a front, a back, a first side, a second side, a top and a bottom defining an internal space. Shafts, rotationally coupled to and extending between the front and the back, are positioned in the internal space. Cables are extendable from and retractable into the housing through holes positioned in the first side. Each of the cables has a first end coupled to one of the shafts and a second end coupled to a locking hub. Ports, which are complimentary to the locking hubs, and a key lock, which is operationally coupled to the ports, are positioned in the second side. A speaker, a processor and a power module are coupled to and positioned in the housing. The processor is operationally coupled to the power module, the speaker and the key lock.

14 Claims, 5 Drawing Sheets

(56) References Cited

U.S. PATENT DOCUMENTS

| | | | |
|---|---|---|---|
| 8,528,372 B2* | 9/2013 | Nilsson | E05B 45/005 242/382 |
| 8,854,207 B2 | 10/2014 | Williams | |
| 8,890,689 B2* | 11/2014 | Ezzo | E05B 73/0017 340/539.11 |
| 2008/0036596 A1* | 2/2008 | Auerbach | E05B 39/00 340/542 |
| 2015/0033807 A1* | 2/2015 | Yang | E05B 47/00 70/14 |

* cited by examiner

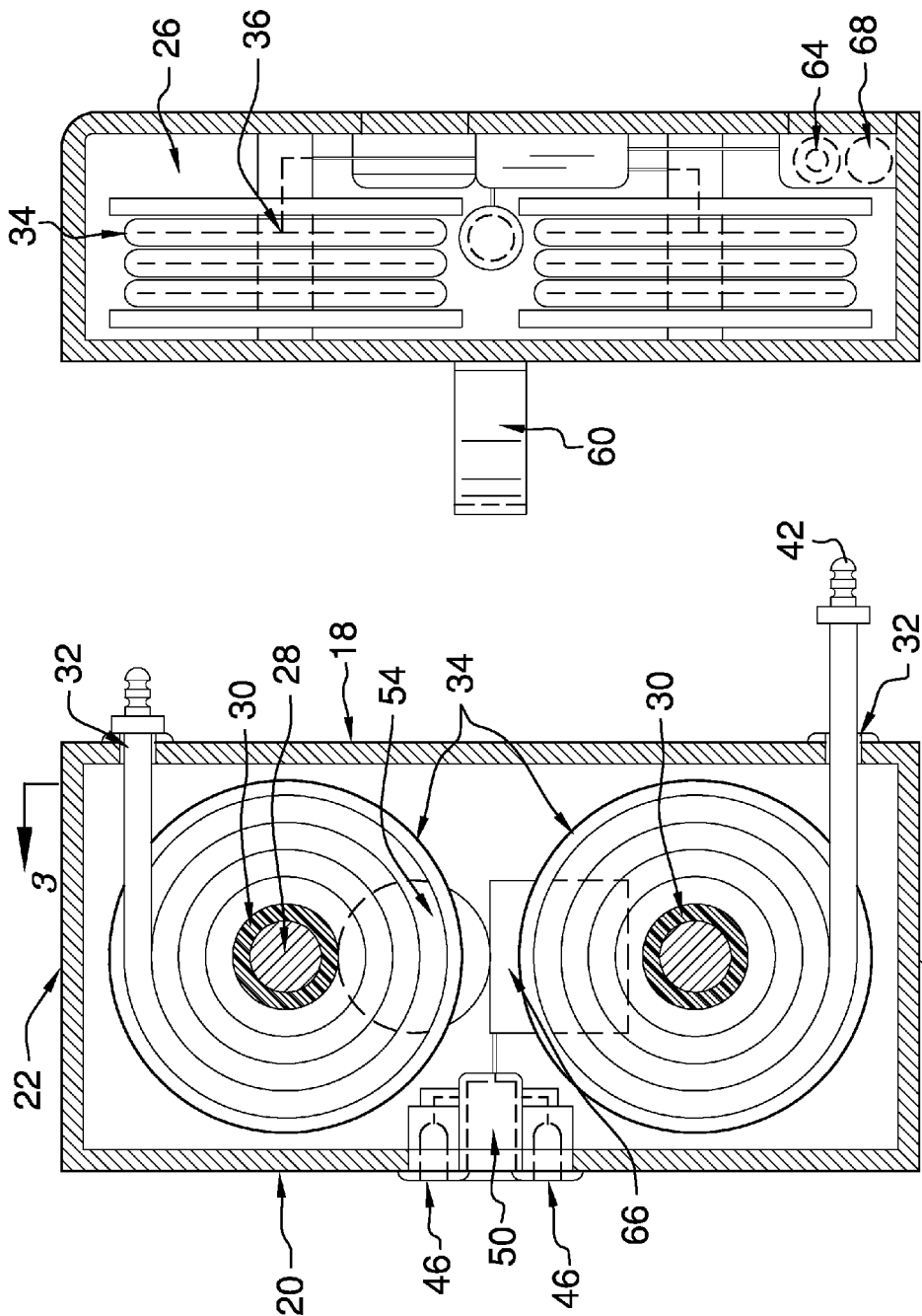

RETRACTABLE CABLE LOCKING DEVICE

BACKGROUND OF THE DISCLOSURE

Field of the Disclosure

The disclosure relates to locking devices and more particularly pertains to a new locking device for securing articles with retractable cables.

SUMMARY OF THE DISCLOSURE

An embodiment of the disclosure meets the needs presented above by generally comprising a housing that has a front, a back, a first side, a second side, a top and a bottom defining an internal space. Shafts, rotationally coupled to and extending between the front and the back, are positioned in the internal space. Cables are extendable from and retractable into the housing through holes positioned in the first side. Each of the cables has a first end coupled to one of the shafts and a second end coupled to a locking hub. Ports, which are complementary to the locking hubs, and a key lock, which is operationally coupled to the ports, are positioned in the second side. A speaker, a processor and a power module are coupled to and positioned in the housing. The processor is operationally coupled to the power module, the speaker and the key lock.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a rear cut-away view of an embodiment of the disclosure.

FIG. 3 is a side cut-way view of an embodiment of the disclosure.

DESCRIPTION OF THE PREFERRED EMBODIMENT

Figure 1:
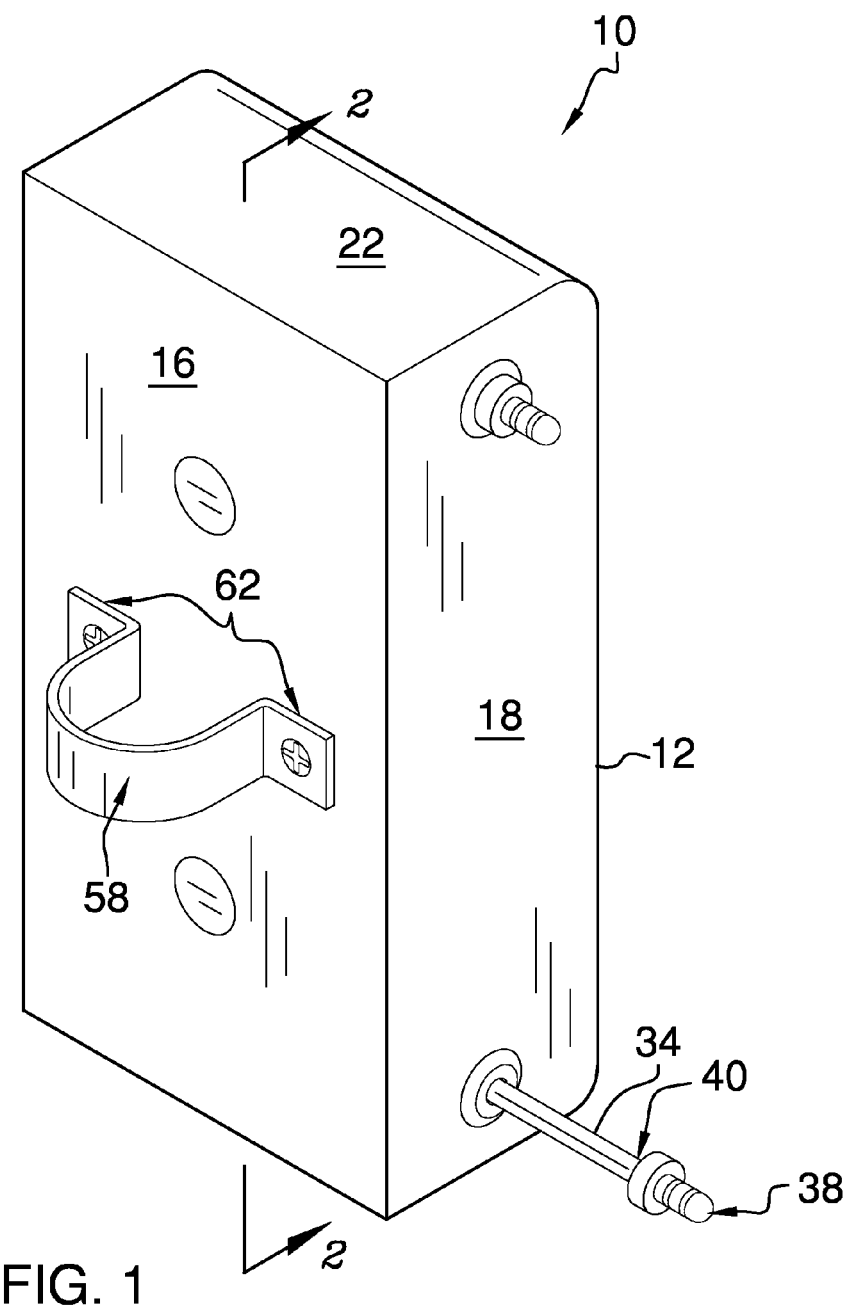
FIG. 1 is a rear isometric perspective view of a retractable cable locking device according to an embodiment of the disclosure.
Figure 4:
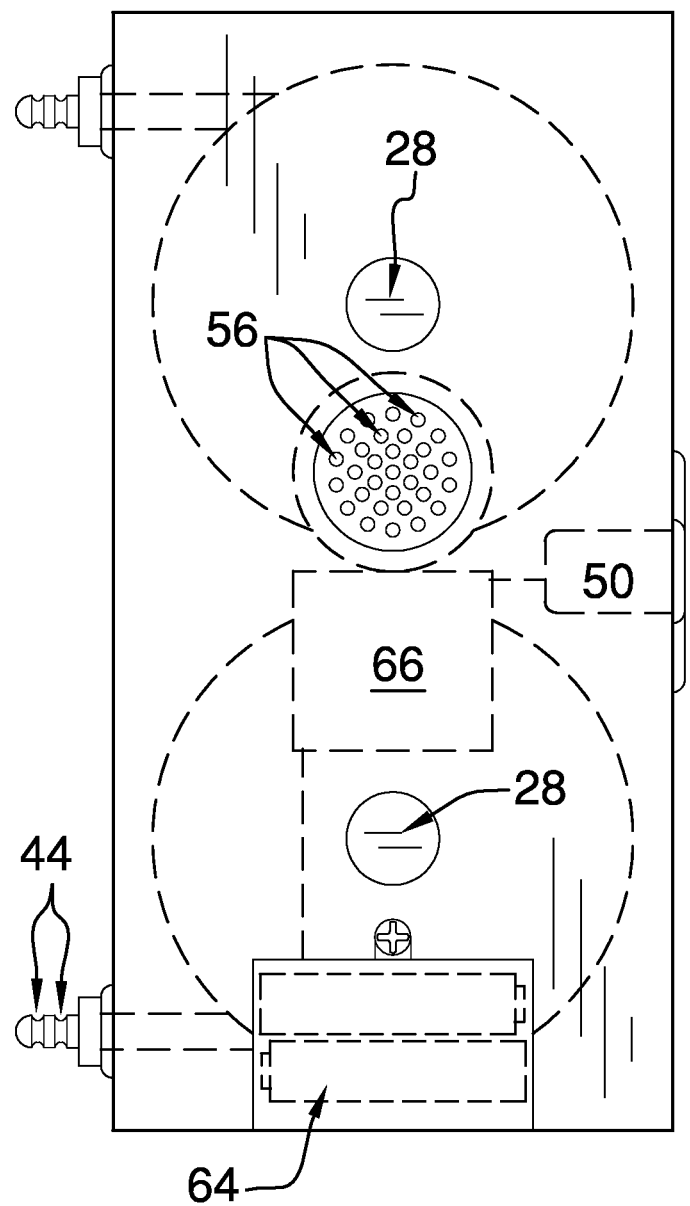
FIG. 4 is a front cut-away view of an embodiment of the disclosure.
Figure 5:
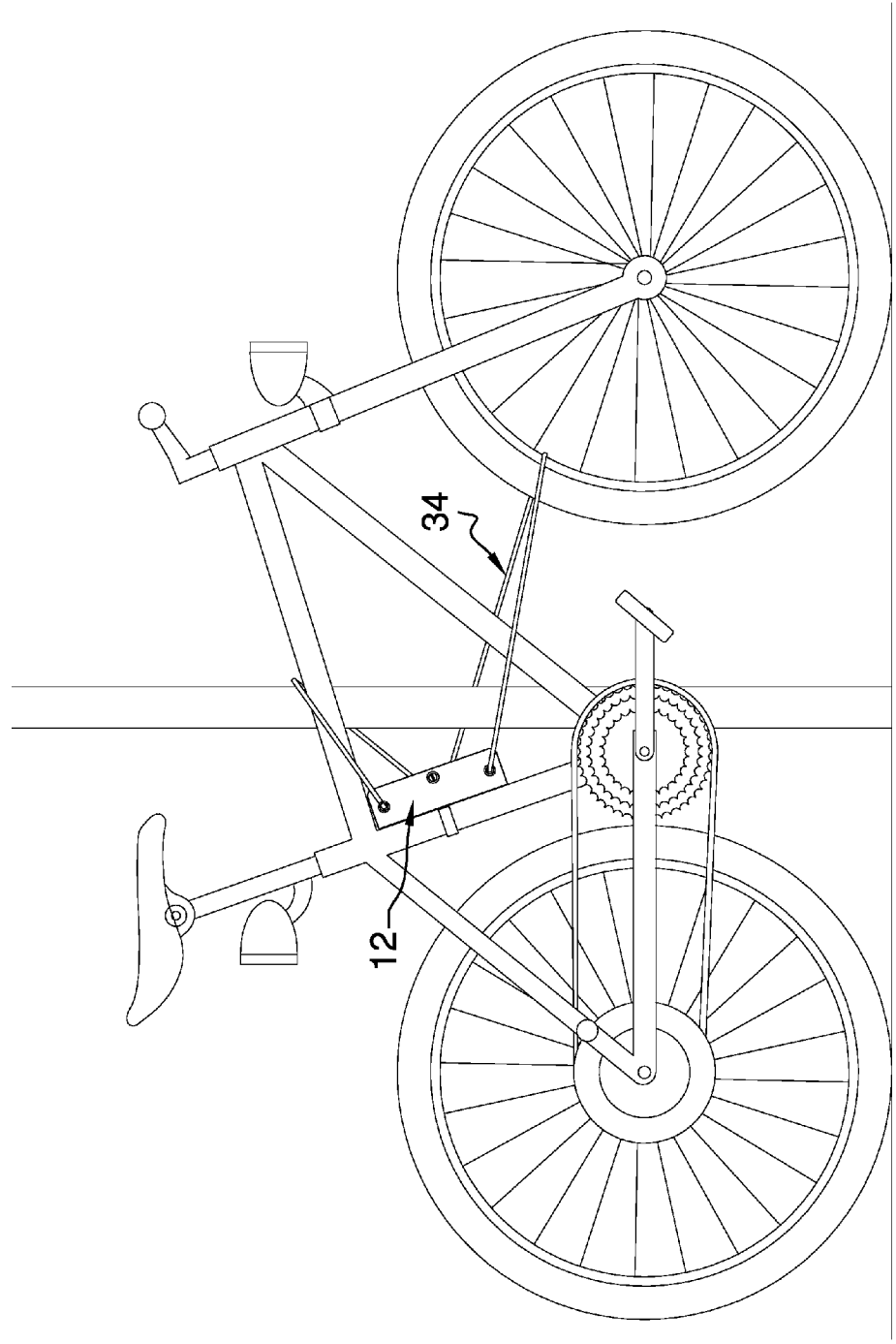
FIG. 5 is an in-use view of an embodiment of the disclosure.
Figure 6:
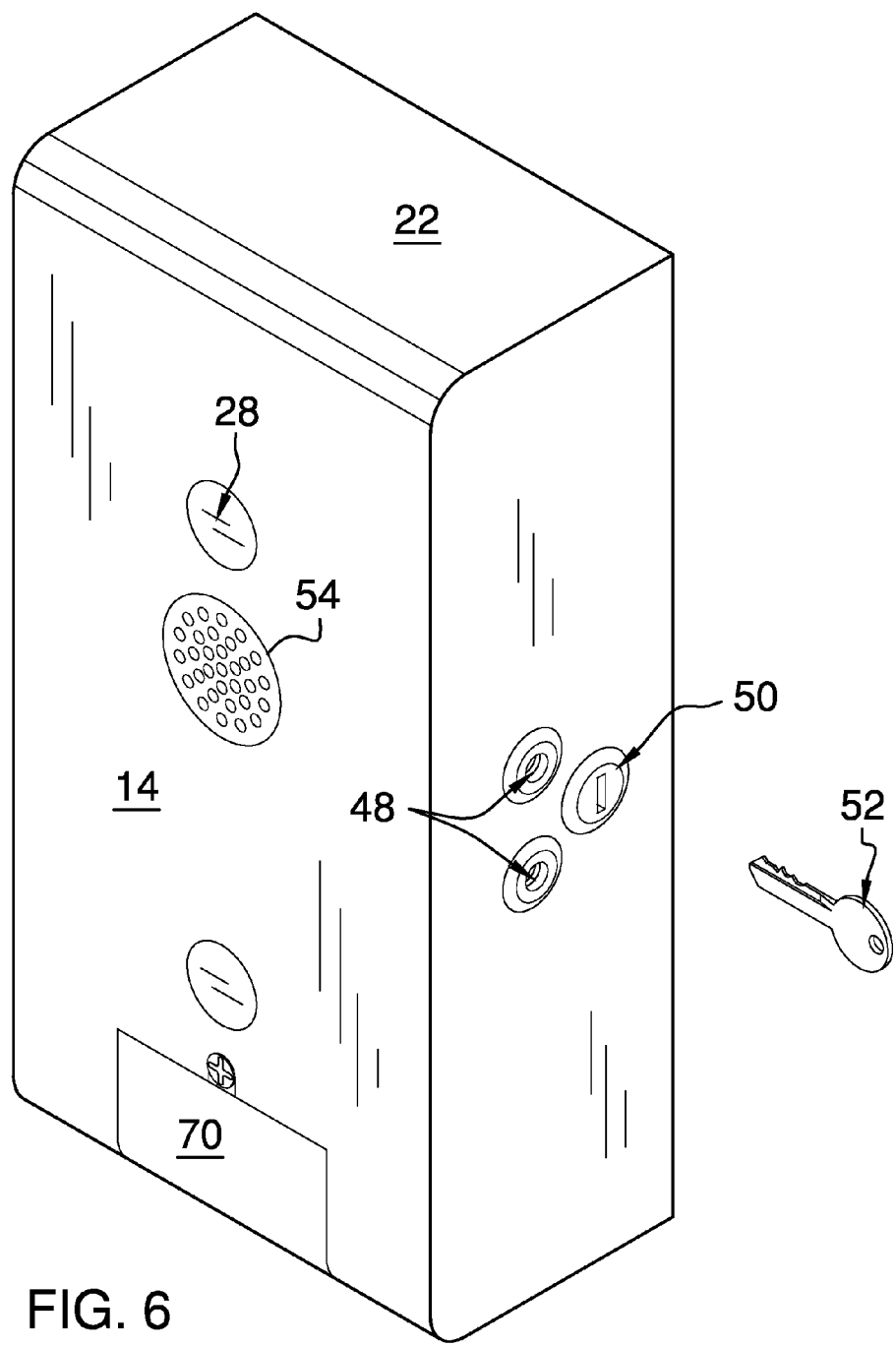
FIG. 6 is a front isometric perspective view of an embodiment of the disclosure.

With reference now to the drawings, and in particular to FIGS. 1 through 6 thereof, a new locking device embodying the principles and concepts of an embodiment of the disclosure and generally designated by the reference numeral 10 will be described.

As best illustrated in FIGS. 1 through 6, the retractable cable locking device 10 generally comprises a housing 12 that has a front 14, a back 16, a first side 18, a second side 20, a top 22 and a bottom 24 defining an internal space 26. A plurality of shafts 28 is positioned in the internal space 26. The shafts 28 are rotationally coupled to and extend between the front 14 and the back 16. The plurality of shafts 28 comprises two shafts. One of each of a plurality of torsional biasers 30 is operationally coupled to a respective one of the plurality of shafts 28, such that rotation of the shafts 28 generates torsional forces in the biasers 30.

A plurality of holes 32 is positioned in the first side 18 of the housing 12. Each of a plurality of cables 34 is extendable from and retractable into the housing 12 through a respective one of the plurality of holes 32. Each of the cables 34 has a first end 36 coupled to a respective one of the shafts 28. The cables 34 may comprise braided steel wire. The cable 34 are configured to be extended from the housing 12 by the user, which generates torsional force in the biaser, such that, upon release of the cable 34, the shaft 28 will rotate and the cable 34 will retract into the housing 12.

Each of a plurality of locking hubs 38 is coupled to a respective second end 40 of a respective cable 34. The hubs 38 are larger than the holes 32. Each of the cables 34 extends from a respective one of the shafts 28 and through a respective one of the holes 32, such that the respective locking hub 38 is positioned outside of the housing 12. The locking hubs 38 comprise cylindrical metal nipples 42. Each nipple 42 has a pair of annular indentations 44. A plurality of ports 46, complementary to the locking hubs 38, is positioned in the second side 20 of the housing 12. The ports 46 have a pair of locking rings 48 that are complementary to the annular indentations 44.

A key lock 50 is positioned in the second side 20 of the housing 12. The key lock 50 is operationally coupled to the ports 46. The ports 46 are positioned to receive the locking hubs 38, such that the key lock 50 can be engaged by the user to secure the locking hubs 38 into the ports 46. The device 10 includes a key 52 that is complementary to the key lock 50.

A speaker 54 is coupled to and positioned in the housing 12. A plurality of penetrations 56 is positioned in the front 14 of the housing 12 proximate to the speaker 54, such that an alarm sounded by the speaker 54 is audible through the penetrations 56. The penetrations 56 are circularly arrayed.

A bracket 58 is coupled to the back 16 of the housing 12. The bracket 58 is configured to secure the housing 12 to a user's property. The bracket 58 comprises a band 60 that is curved, comprised of metal, and having opposing flanged ends 62. The flanged ends 62 are reversibly couplable to the housing 12, such that the band 60 is configured to secure the housing 12 to a bicycle frame.

A power module 64 and a processor 66 are coupled to and positioned in the housing 12. The power module 64 comprises at least one battery 68. The processor 66 is operationally coupled to the power module 64, the speaker 54 and the key lock 50. An access panel 70 is positioned in the front 14 proximate to the power module 64, such that the access panel 70 is removable by the user to access the power module 64.

In use, the cable 34 is configured to be extended by the user around a stationary object. The locking hub 38 of the cable 34 then is inserted into a respective one of the ports 46, thus completing an electrical circuit that comprises the cable 34, the port 46, and the locking hub 38. Interruption of the electrical circuit absent the key 52, or attempted unlocking without the key 52, will induce the processor 66 to send an alarm signal to the speaker 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retractable cable locking device comprising:
   a housing, said housing having a front, a back, a first side, a second side, a top and a bottom defining an internal space;
   a plurality of shafts, said shafts being positioned in said internal space, said shafts being rotationally coupled to and extending between said front and said back;
   a plurality of holes positioned in said first side of said housing;
   a plurality of cables, each said cable being extendable from and retractable into said housing through a respective one of said plurality of holes, each of said cables have a first end coupled to a respective one of said shafts;
   a plurality of locking hubs, each of said locking hubs being coupled to a respective second end of a respective said cable;
   a plurality of ports, said ports being complementary to said locking hubs, said ports being positioned in said second side of said housing;
   a key lock, said key lock being positioned in said second side of said housing, said key lock being operationally coupled to said ports;
   a speaker, said speaker being coupled to and positioned in said housing;
   a power module, said power module being coupled to and positioned in said housing; and
   a processor, said processor being coupled to and positioned in said housing, said processor being operationally coupled to said power module, said speaker and said key lock.

2. The device of claim 1, further including a plurality of torsional biasers, one of each of said plurality of torsional biasers being operationally coupled to a respective one of said plurality of shafts, wherein rotation of said shafts generates torsional forces in said biasers.

3. The device of claim 1, further including a key, said key being complementary to said key lock.

4. The device of claim 1, further including a bracket, said bracket being coupled to said back of said housing.

5. The device of claim 4, further comprising:
   said bracket comprising a band, said band being curved, said band being metal;
   said band having opposing flanged ends, said ends being reversibly couplable to said housing; and
   wherein said band is configured to secure said housing to a bicycle frame.

6. The device of claim 1, further including an access panel, said access panel being positioned in said front proximate to said power module, wherein said access panel is removable by the user to access said power module.

7. The device of claim 1, further including said power module comprising at least one battery.

8. The device of claim 1, further including said plurality of shafts comprising two shafts.

9. The device of claim 1, further including said cables comprising braided steel wire.

10. The device of claim 1, further including said locking hubs being larger than said holes, wherein each of said cables extends from said respective one of said shafts through said respective one of said plurality of holes, such that said locking hubs are positioned outside of said housing.

11. The device of claim 1, further comprising:
    said locking hubs comprising cylindrical metal nipples, each said nipple having a pair of annular indentations; and
    said ports having a pair of locking rings, said locking rings being complementary to said annular indentations.

12. The device of claim 1, further including a plurality of penetrations, said penetrations being positioned in said front of said housing proximate to said speaker.

13. The device of claim 12, further including said penetrations being circularly arrayed.

14. A retractable cable locking device comprising:
    a housing, said housing having a front, a back, a first side, a second side, a top and a bottom defining an internal space;
    a plurality of shafts, said shafts being positioned in said internal space, said shafts being rotationally coupled to and extending between said front and said back, said plurality of shafts comprising two shafts;
    a plurality of torsional biasers, one of each said plurality of torsional biasers being operationally coupled to a respective one of said plurality of shafts, wherein rotation of said shafts generates torsional forces in said biasers;
    a plurality of holes positioned in said first side of said housing;
    a plurality of cables, each said cable being extendable from and retractable into said housing through a respective one of said plurality of holes, each of said cables have a first end coupled to a respective one of said shafts, said cables comprising braided steel wire, wherein said cables are configured to be extended from said housing by the user and wherein extending said cables generates torsional force in said biaser, such that, upon release of said cable, said shaft will rotate and said cable will retract into said housing;
    a plurality of locking hubs, each of said locking hubs being coupled to a respective second end of a respective said cable, said hubs being larger than said holes, wherein each of said cables extends from said respective one of said shafts through a respective one of said holes, such that said locking hubs are positioned outside of said housing, said locking hubs comprising cylindrical metal nipples, each said nipple having a pair of annular indentations;

a plurality of ports, said ports being complementary to said locking hubs, said ports being positioned in said second side of said housing, said ports having a pair of locking rings, said locking rings being complementary to said annular indentations;

a key lock, said key lock being positioned in said second side of said housing, said key lock being operationally coupled to said ports, wherein said ports are positioned to receive said locking hubs and said key lock can be engaged by the user to lock said locking hubs into said ports;

a key, said key being complementary to said key lock;

a speaker, said speaker being coupled to and positioned in said housing;

a plurality of penetrations, said penetrations being positioned in said front of said housing proximate to said speaker, wherein an alarm sounded by said speaker is audible through said penetrations, said penetrations being circularly arrayed;

a bracket, said bracket being coupled to said back of said housing, wherein said bracket is configured to secure said housing to a user's property, said bracket comprising a band, said band being curved, said band being metal, said band having opposing flanged ends, said ends being reversibly couplable to said housing, wherein said band is configured to secure said housing to a bicycle frame;

a power module, said power module being coupled to and positioned in said housing, said power module comprising at least one battery;

a processor, said processor being coupled to and positioned in said housing, said processor being operationally coupled to said power module, said speaker and said key lock;

an access panel, said access panel being positioned in said front proximate to said power module, wherein said access panel is removable by the user to access said power module;

wherein each of said cables is configured to be extended by the user around a stationary object with said locking hub then being inserted into a respective one of said ports, completing a respective electrical circuit comprising said cable, said port, and said locking hub, such that interruption of the respective electrical circuit absent said key, or attempted unlocking without said key, will induce said processor to send an alarm signal to said speaker.

\* \* \* \* \*